United States Patent

Clark

[15] 3,676,984
[45] July 18, 1972

[54] DRILLING MUD DEGASSER

[72] Inventor: Joseph Edwin Clark, 3132 10th St., N.W., Calgary, Alberta, Canada

[22] Filed: Oct. 22, 1970

[21] Appl. No.: 83,093

[52] U.S. Cl. .................................................. 55/193
[51] Int. Cl. .................................................. B01d 19/00
[58] Field of Search .................. 55/41, 43, 55, 57, 192, 193, 55/202, 206; 165/115; 261/112

[56] References Cited

UNITED STATES PATENTS

| | | | |
|---|---|---|---|
| 2,748,884 | 6/1956 | Erwin | 55/193 |
| 3,540,192 | 11/1970 | Nystrom et al. | 55/192 |
| 2,271,648 | 2/1942 | Kleist | 165/115 X |

*Primary Examiner*—Reuben Friedman
*Assistant Examiner*—R. W. Burks
*Attorney*—Millen, Raptes & White

[57] ABSTRACT

A novel inlet and baffle structure for a drilling and degasser is provided. Gas-cut mud is fed into the degasser vacuum chamber through a horizontal inlet pipe having a long slot cut in its bottom wall. The mud flow is formed into a thin curtain as it passes through this slot. At the same time, its rate of movement is accelerated, with a consequent increase in shear and drop in viscosity. The mud immediately contacts a generally horizontal baffle. The flow is divided into two turbulent, thin layers. It is then conducted through a system of baffles. Due to the change in mud viscosity, induced turbulence and the forming of the mud flow into thin layers of large area, the vacuum within the chamber is able to effectively separate the entrained gas from the mud.

2 Claims, 4 Drawing Figures

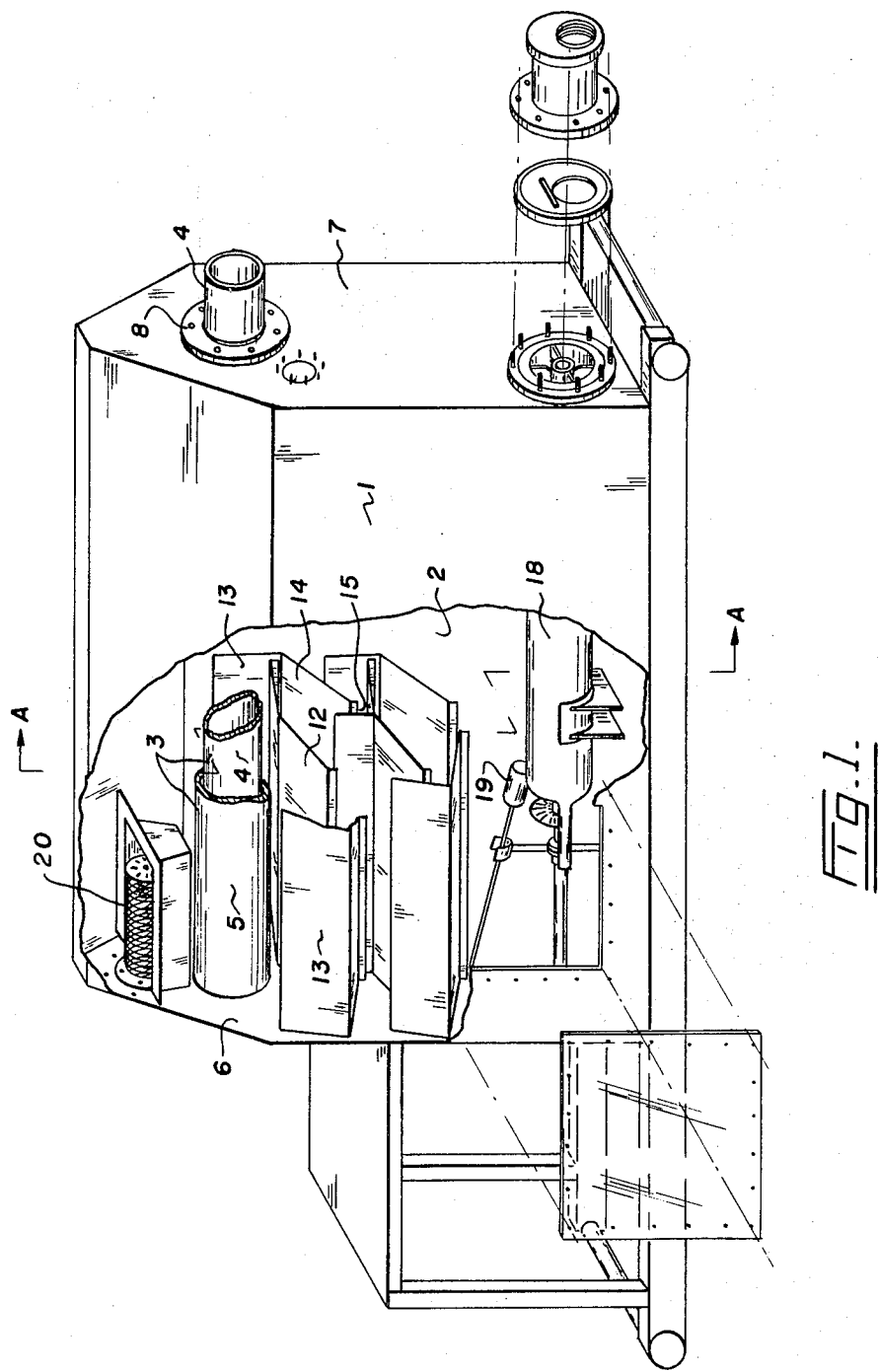

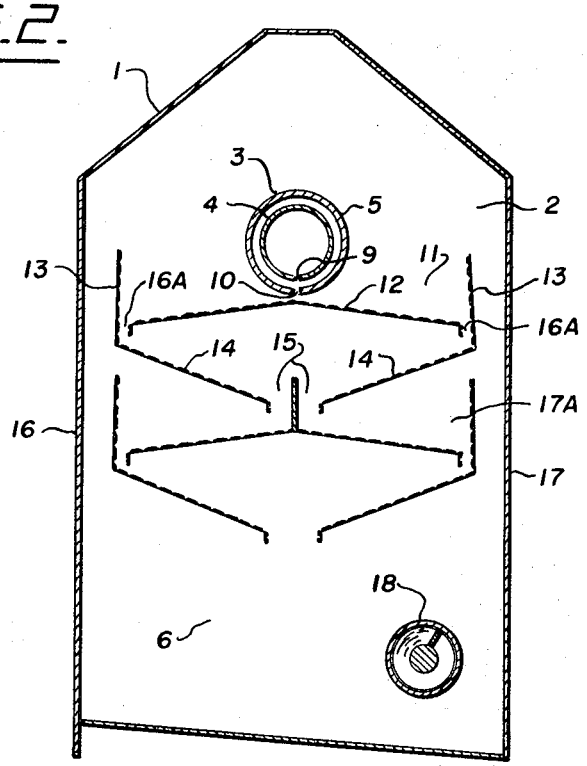
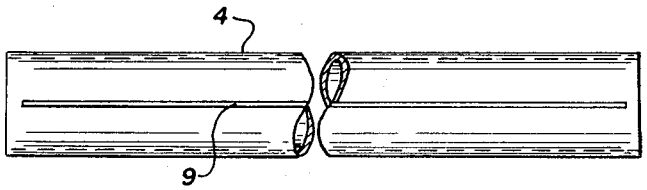
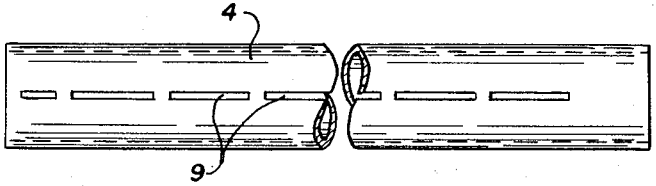

DRILLING MUD DEGASSER

BACKGROUND OF THE INVENTION

This invention relates to an apparatus for degassifying mud. More particularly, it relates to a degasser which employs a new and improved inlet and baffle structure.

In the drilling of oil or gas wells, the drilling mud used in the operation can entrain formation gas and become lightened. In many cases, it is necessary to degassify the mud to avoid the danger of a blow-out.

In this connection, various forms of an apparatus known as a "degasser" have been developed. These degassers incorporate the same basic principles of operation: The gas-cut mud from the drilling operation is drawn into a degassing chamber maintained at sub-atmospheric pressure. The entering flow is divided by a baffle arrangement to expose large areas of mud in the form of thin layers. The vacuum maintained within the chamber acts to draw the entrained gas from the thin layers of mud. The degassified mud is returned to the drilling operation while the gas is drawn off by the vacuum pump and exhausted in a suitable manner.

The state of the prior art relating to degassers is exemplified by the following United States Pat. Nos: 3,241,295, 3,358,425 and 3,481,113.

SUMMARY OF THE INVENTION

It is an object of this invention to provide a degasser having simple and inexpensive inlet and baffle structures which are adapted to combine to promote a desirable degree of degassification of gas-cut drilling mud.

In accordance with the invention, the gas-cut mud is fed into the vacuum chamber through one or more narrow openings or apertures, such as long slots, formed in the wall of the inlet pipe. The mud therefore enters the chamber in the form of one or more long, thin curtains. The total cross sectional area of these apertures is less than the transverse cross sectional area of the inlet pipe; the movement of the mud is therefore accelerated as it passes through the apertures. As a result, the mud is subjected to shear with a concomitant decrease in viscosity.

A baffle is mounted within the vacuum chamber adjacent to the inlet pipe openings. This baffle is positioned transversely to the plane of the curtain of mud entering through the openings. The mud therefore contacts the baffle as it enters the vacuum chamber and is divided into two thin sheets moving outwardly toward the edges of the baffle. The impact has the effect of atomizing the mud or converting it to a very turbulent condition.

The combination of forming the mud flow into thin sheets and subjecting it to shear and turbulence in the manner described has the effect of placing the entrained gas into a condition wherein it is available for separation from the mud by vacuum.

BRIEF DESCRIPTION OF THE DRAWING

Turning to the drawing:

FIG. 1 is a perspective side view of the degasser, partially broken away to show the inlet and baffle structures;

FIG. 2 is an end sectional view taken along the line A—A of FIG. 1;

FIG. 3 is a bottom view of the inlet pipe; and

FIG. 4 is a bottom view of an alternative inlet pipe structure.

DESCRIPTION OF THE PREFERRED EMBODIMENT

Referring now to FIGS. 1 and 2, a housing 1 is shown. This housing is a steel structure of generally rectangular form. It is hollow and defines a sealed vacuum chamber 2.

An inlet structure 3 is mounted within the upper part of the vacuum chamber 2. This structure 3 includes inner and outer pipes 4, 5. Both pipes are horizontally disposed. The outer pipe 5 is fixed at its ends, as by welding, to the housing walls 6, 7. The inner pipe is concentrically mounted within the outer pipe 5 and extends out through the seal flange 8 in the wall 7. It is suitably connected into the rig mud system so that gas-cut mud can be drawn into the vacuum chamber 2.

The bottom wall of inner pipe 4 defines one or more downwardly opening slots 9. These slots 9 are aligned with the longitudinal axis of the pipe 4. A single slot may be used, as shown in FIG. 3, or several shorter slots or openings may be provided, as shown in FIG. 4. In either case, the total cross sectional area of the slots 9 is less than the transverse cross sectional area of the inner pipe 4; a restriction is therefore formed in the mud flow path. By "transverse" is meant perpendicular to the longitudinal axis of the pipe 4.

The bottom wall of outer pipe also defines a downwardly opening slot 10. In the embodiment shown, this slot 10 is wider than slot 9. The slots 9, 10 are vertically aligned.

Outer pipe 5 is not important to the invention. When pipe 4 is withdrawn for cleaning, pipe 5 acts as a guide and support during re-insertion. Longitudinal ribs (not shown) can be provided along the exterior surface of pipe 4 and the interior surface of pipe 5 to space the pipes apart and key their slots into proper alignment.

A baffle structure 11 is mounted in the vacuum chamber 2, beneath the slot 10. This structure is so constructed as to divide the curtain of mud issuing from the slot 10 into two thin layers and to support and guide these layers along separate tortuous paths leading to the bottom part of the vacuum chamber 2.

More specifically, the baffle structure 11 is comprised of an arrangement of baffles 12, 13 and 14. Each of these baffles is coextensive with slot 10. Baffle 12 is positioned immediately beneath the slot 10. It is generally horizontal and extends outwardly from the slot 10 towards the sides 16, 17 of the housing 1. a pair of baffles 14 are spaced beneath the baffle 12. These baffles 14 are downwardly inclined toward each other; they define a central gap 15 between them. Upwardly inclined deflector baffles 13 are spaced outwardly from each side edge of baffle 12. Drop openings 16 are defined between the deflector baffles 13 and baffle 12.

In the embodiment shown, a second baffle arrangement 17 similar to the one just described is mounted to receive the mud flow entering gap 15. Several of these baffle arrangements can be mounted in one degasser; two is usually sufficient for most circumstances.

A conventional screw-type auger 18 extends into the bottom of the vacuum chamber 2. This auger 18 serves to remove degassified mud therefrom. The auger 18 is modified by welding a one-half inch horizontal lip to the top edge of the auger flight so as to prevent backflow. The auger is actuated by the float 19 in conventional manner.

A vacuum port 20, equipped with a filter and splash guard, extends into the top of the vacuum chamber 2.

In operation, the gas-out mud is drawn into the degasser through the inlet structure 3 by pressure differential. As the mud passes through the narrow slot 9, it is formed into long, thin curtains. In addition, the restriction in cross sectional area causes an acceleration of the rate of movement of the mud. This acceleration is accompanied by a drop in mud viscosity. As the thin curtain of mud issues from the slot 9, it immediately strikes baffle 12 and is divided into two thin, outwardly moving sheets. The turbulent impact of the mud flow against the baffle 12 further encourages gas break-out. As the thin layers of mud follow the tortuous paths defined by the baffles, they are maintained in a turbulent condition by striking the deflection baffles 13. The vacuum conditions within the chamber, of course, act to break the gas free from the roiling, thin layers of mud. The gas is drawn off through the vacuum port 20 and exhausted. The de-gassified mud is withdrawn from the vacuum chamber 2 by the auger 18 and returned to the rig mud system.

It will thus be seen that a degasser is provided having an inlet and baffle arrangement which combine to lower the viscosity of the mud and simultaneously form it into thin layers of large area. The separation of gas from the mud by vacuum is encouraged by these conditions. The structure which is disclosed is relatively simple and inexpensive to construct.

The embodiments of the invention in which an exclusive property or privilege is claimed are defined follows:

1. In a drilling mud degasser having a vacuum housing defining a chamber, an inlet pipe for admitting gas-cut mud into the upper part of the chamber, an outlet structure for removing degassified mud from the bottom part of the chamber, and a baffle means between the inlet pipe and outlet structure for dividing the flow of gas-cut mud into thin layers and maintaining the mud in that state for a period of time to permit entrapped gas to be removed by vacuum, the improved inlet pipe and baffle means comprising:

a substantially horizontal inlet pipe extending into the upper part of the chamber, said pipe defining a downwardly opening aperture in its wall for admitting gas-cut mud into the chamber, said aperture having an area which is less than the transverse cross sectional area of the pipe whereby the mud flow is accelerated and subjected to shear as it passes through the aperture; and an elongate baffle mounted in the chamber in transverse relation to the chamber's vertical axis, said baffle being coextensive with the aperture and being disposed adjacent to and beneath it whereby the gas-cut mud entering the chamber through the aperture is divided into at least two thin, turbulent layers supported by the baffle.

2. The apparatus as set forth in claim 1 wherein:

the aperture defined by the pipe is an elongate, downwardly-opening slot whereby the gas-cut mud is admitted into the chamber in the form of a long, thin curtain.

* * * * *